United States Patent [19]
Sato

[11] Patent Number: 5,382,368
[45] Date of Patent: Jan. 17, 1995

[54] METHOD FOR DEWATERING SLUDGE

[75] Inventor: Hachiro Sato, Tokyo, Japan

[73] Assignee: Fukoku Kogyo Co., Ltd., Tokyo, Japan

[21] Appl. No.: 63,972

[22] Filed: May 20, 1993

[51] Int. Cl.$^6$ .............................................. C02F 11/14
[52] U.S. Cl. ..................................... 210/710; 210/712; 210/768; 210/770; 210/804
[58] Field of Search ................. 210/609, 710, 712, 727, 210/768, 770, 804

[56] References Cited

U.S. PATENT DOCUMENTS

| | | | |
|---|---|---|---|
| 3,578,586 | 5/1971 | Gal et al. | 210/710 |
| 3,684,092 | 8/1972 | Busse et al. | 210/768 |
| 4,192,743 | 3/1980 | Bastgen et al. | 210/770 |
| 4,997,578 | 3/1991 | Berggren | 210/770 |
| 5,160,440 | 11/1992 | Merai | 210/770 |
| 5,183,562 | 2/1993 | Totoki et al. | 210/85 |
| 5,281,340 | 1/1994 | Sato et al. | 210/734 |

Primary Examiner—Peter A. Hruskoci
Attorney, Agent, or Firm—Varndell Legal Group

[57] ABSTRACT

In the Invention is directed to a method and apparatus for dewatering sludge wastes discharged from a factory such as pulp factory. Sludge wastes are first dewatered by a preliminary dewatering device such as a pre-thickener of a rotary screen type, sludge discharged from the preliminary dewatering device is then supplied to a main dewatering device such as a screw press. Waste liquid discharged from the preliminary and main dewatering devices are supplied to an agglutinating reaction tank together with a macromolecular agglutinating reagent and agglutinated substances in the agglutinating reaction tank are treated by the main dewatering device. The agglutinated substances formed on the bottom surface of the agglutinating reaction tank can be treated by a second main dewatering device other than the main dewatering device. A necessary amount of the macromolecular agglutinating reagent supplied to the agglutinating reaction tank can be reduced without deteriorating the dewatering efficiency.

13 Claims, 2 Drawing Sheets

METHOD FOR DEWATERING SLUDGE

BACKGROUND OF THE INVENTION

1. Field of the Invention

The present invention relates to a method and apparatus for dewatering sludge wastes discharged from various factories, such as a paper pulp factory, a chemical factory and a food factory.

2. Related Art Statements

Heretofore, sludge wastes of the paper industry has been treated in the following manner. The sludge wastes are first supplied to a clarifier to settle solid substances, and then the settled sludge is introduced into an agglutinating reaction tank to which a macromolecular agglutinating agent is also supplied by such an amount that it is substantially proportional to an amount of the introduced sludge. Next, the thus agglutinated sludge is supplied to a dewatering device such as a screw press and dewatered solid substances are discharged or burned at a predetermined waste treating site.

FIG. 1 is a schematic view showing a known sludge treating system for performing the known sludge treating method. A settled sludge S discharged from the above mentioned clarifier is supplied into an agglutinating reaction tank 2 having an agitator 1 installed therein. Into the agglutinating reaction tank 2 an agglutinating agent P consisting of various kinds of macromolecular substances is supplied to carry out the agglutinating reaction. Then, the agglutinated sludge is supplied via a preliminary dewatering device 3 to a main dewatering device 4 formed by a screw press. Solid substances, i.e. a dewatered cake Sa, is burned or discharged at a waste treating site and a waste water L discharged out of the screw press 4 is supplied to the clarifier 2. A supernatant in the clarifier 2 is discharged out of the sludge treating system.

In the known pulp sludge treating system, the macromolecular agglutinating agent is supplied into the clarifier 2 by such an amount that it is proportional to a total amount of the pulp sludge supplied from the factory into the agglutinating reaction tank, otherwise the dewatering efficiency might be decreased. Therefore, a large amount of the expensive agglutinating agent, such as 230 kg/day, has to be introduced into the agglutinating reaction tank 2, and the operating cost for treating the sludge tends to be high. Particularly, in the paper pulp factory a very large amount of the sludge is produced and thus a very large amount of the macromolecular agglutinating agent is used. This causes a serious problem.

SUMMARY OF THE INVENTION

An object of the present invention is to provide a novel and useful method and apparatus for dewatering sludge wastes discharged out of a factory, in which an amount of necessary macromolecular agglutinating agent can be reduced materially without decreasing the dewatering efficiency.

According to the present invention, the method of dewatering sludge wastes comprises the step of:

supplying the sludge wastes into a preliminary dewatering device to obtain a preliminarily dewatered sludge;

supplying the preliminarily dewatered sludge discharged from the preliminary dewatering device into a main dewatering device;

supplying waste water discharged out of the preliminary dewatering device and waste water discharged out of the main dewatering device into an agglutinating reaction tank;

supplying a macromolecular agglutinating agent into agglutinating reaction tank to form an agglutinated sludge; and dewatering the agglutinated sludge formed in the agglutinating reaction tank by supplying it into the main dewatering device or another main dewatering device.

The apparatus according to the present invention includes:

a preliminary dewatering device which receives sludge waste, dewaters the sludge waste, and discharges dewatered sludge and waste water, a main dewatering device for receiving the dewatered sludge, further dewatering the dewatered sludge and forming a solid substance, and discharging the solid substance and waste water, and an agglutinating reaction tank which receives an agglutinating agent and the waste waters from the preliminary dewatering device and the main dewatering device, agglutinates the sludge in these waste waters and supplies waste water with the agglutinated sludge to the preliminary dewatering device.

In the apparatus and method according to the present invention, the raw sludge wastes are processed by the preliminary and main dewatering devices successively to remove and discharge a substantial amount of liquids contained in the raw sludge wastes and the water wastes discharged from the preliminary and main dewatering devices are introduced into the agglutinating reaction tank. Therefore, the amount of the macromolecular agglutinating agent necessary for dewatering the sludge can be greatly reduced from about 230 kg/day for the prior art systems to about 35 kg/day for the present invention.

DETAILED DESCRIPTION OF THE PREFERRED EMBODIMENTS

Figure 1:
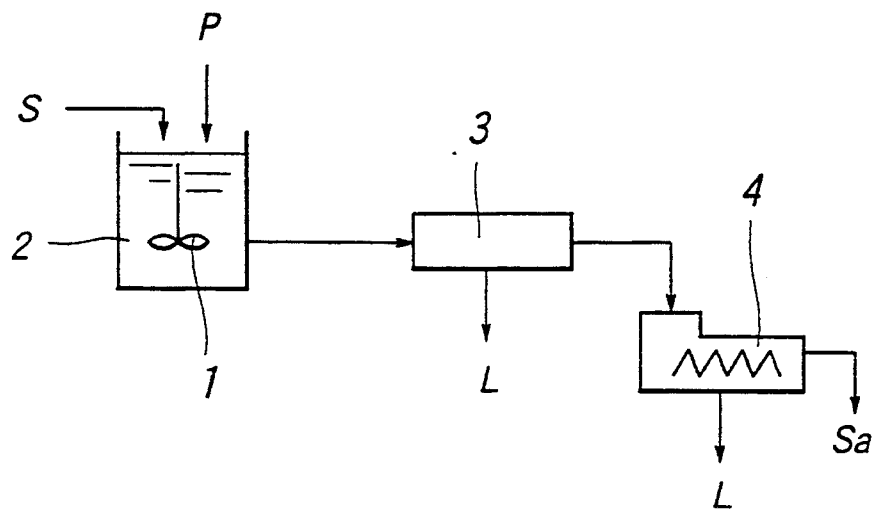
FIG. 1 is a schematic view showing a known sludge waste treating system.
Figure 2:
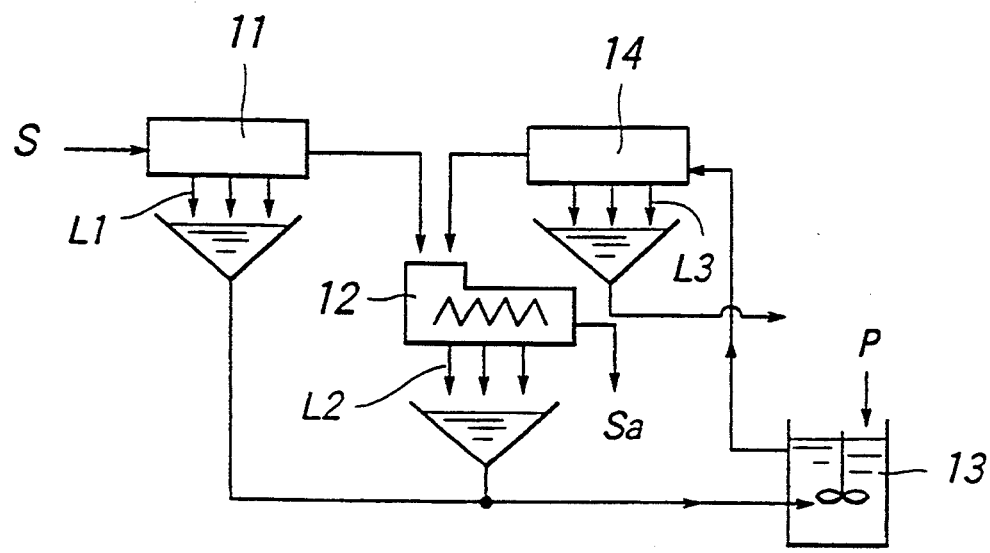
FIG. 2 is a schematic view illustrating a principal construction of a system for performing the sludge waste treating method according to the invention.

FIG. 2 is a schematic view showing a principal construction of a sludge treating system for performing the method according to the present invention. In this system a raw sludge wastes S discharged out of a factory is first processed by a clarifier (not shown) and solid substances are settled on the bottom of the clarifier. The settled sludge is supplied to a preliminary dewatering device 11 and at least a portion of the water or liquid contained in the sludge can be discharged. The preliminary dewatering press 11 can be formed by a pre-thickener of a rotary screen type, The sludge discharged from the preliminary dewatering device 11 is supplied to a main dewatering device 12 which can be formed by a screw press. A waste water L1 discharged from the preliminary dewatering device 11 and a waste water L2 discharged out of the main dewatering device 12 are supplied into an agglutinating reaction tank 13, to which a macromolecular agglutinating reagent P is also supplied.

According to the present invention, the waste waters L1 and L2 introduced into the agglutinating reaction tank 13 have been pressed so that they contain only a small amount of solid substances. Therefore, the amount of the macromolecular agglutinating agent supplied to the agglutinating reaction tank 13 can be made much smaller. In other words, the waste waters L1 and L2 introduced into the agglutinating reaction tank 13 can be efficiently processed by a smaller amount of the macromolecular agglutinating agent P. The macromolecular agglutinating agent can be an anionic polymers, such as polyacrylic amide surfactants (i.e., A-120), and/or cationic polymers, such as polyacrylic ester surfactants (e.g. KP-155). When used together, the cationic surfactants can be added to the agglutinating reaction tank in such a manner that the some of the sludge has already been agglutinated by the anionic surfactants. Sludge agglutinated in the agglutinating reaction tank 13 can be treated by a preliminary dewatering device 14 and sludge discharged out of the preliminary dewatering device 14 can be then supplied to the main dewatering device 12 together with the sludge discharged out of the preliminary dewatering device 11. Waste water L3 discharged out of the second preliminary dewatering device 14 can be supplied to the clarifier. The waste water L2 discharged out of the main dewatering device 12 is supplied to the agglutinating reaction tank 13. In this manner, the waste waters L1, L2 and L3 are repeatedly subjected to the dewatering process and the water contained in the raw sludge can be removed in an efficient manner, while a necessary amount of the expensive macromolecular agglutinating reagent can be reduced. Solid substance Sa discharged out of the main dewatering device 12 is finally treated in an usual manner and is discharged or burned at a predetermined waste treating site.

It should be noted in the embodiment illustrated in FIG. 2, the agglutinated sludge formed in the agglutinating reaction tank 13 is supplied to the main dewatering device 12 by means of the second preliminary dewatering device 14, but it can be directly introduced into the main dewatering device 12.

Figure 3:
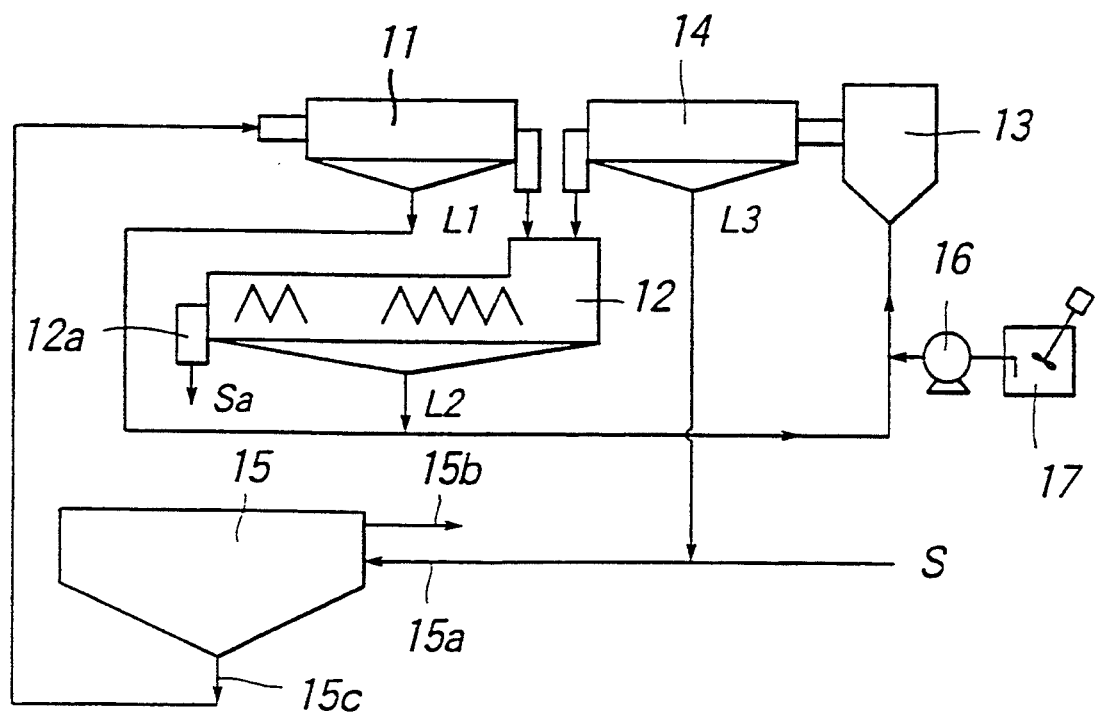
FIG. 3 is a schematic view depicting a construction of a system for carrying out an embodiment of the sludge treating method according to the invention.

FIG. 3 is a schematic diagram showing the construction of the sludge treating apparatus according to the invention for performing the method according to the present invention. In this embodiment, first and second preliminary dewatering devices 11 and 14 are formed by the pre-thickener of the rotary screen type and the main dewatering device 12 is constructed as a screw press. Reference numeral 15 denotes the clarifier, and reference numeral 16 represents a pump for supplying a measured amount of the macromolecular agglutinating agent P into the agglutinating reaction tank 13 from agglutinating agent supply tank 17. The raw sludge S is introduced into the clarifier 15 by means of an inlet 15$a$, a supernatant is discharged out of the clarifier by means of a first outlet 15$b$, and a settled sludge is supplied to the first pre-thickener 11 by means of a second outlet 15$c$. In the screw press 12, the solid substance Sa is discharged from an outlet 12$a$.

In an experimental system for treating the sludge discharged out of the paper pulp manufacturing factory, the raw sludge S supplied to the first preliminary dewatering device 11 had a concentration of solid substances of about 4.4%, and the concentration of solid substances in the sludge supplied from the first preliminary dewatering device 11 into the main dewatering device 12 was increased to about 13%. The concentration of solid substances in the waste water L1 discharged out of the first preliminary dewatering device 11 was 2.6%, and the concentration of solid substances in the waste water L2 discharged out of the main dewatering device 12 was 0.2%. The concentration of solid substances in the sludge supplied from the second preliminary dewatering device 14 into the main dewatering device 12 was 8%, and the concentration of solid substances in the waste water supplied from the second dewatering device 14 into the clarifier 15 was 0.15%.

In a typical operation of the system shown in FIG. 3 and with the concentrations of solid substances as discussed above, a large amount of sludge can be processed by using a significantly smaller amount of agglutinating agent. For example, raw sludge S having a concentration of 4.4% in the amount 2,400 tons/day ("tons"=metric tons) can be supplied from the clarifier 15 to the first preliminary dewatering device 11, and the resulting dewatered sludge having a concentration of 13% in the amount of 600 tons/day can be supplied from the first preliminary dewatering device 11 into the main dewatering device 12. Waste water L1 having a concentration of 2.6% and in the amount of 1,800 tons/day can be discharged out of the first preliminary dewatering device 11 into the agglutinating tank 13, and waste water L2 having a concentration of 0.2% and in the amount of 770 tons/day can be discharged out of the main watering device 12 into the agglutinating tank 13. Dewatered sludge at a concentration of 8% and in the amount 550 tons/day can be supplied from the second preliminary dewatering device 14 into the main watering device 12. Waste water having a concentration of 0.15% and in amount of 1,650 tons/day can be supplied from the second dewatering device 14 into the clarifier 15. In addition, the amount of solid substance Sa discharge from outlet 12$a$ is in the amount of 380 tons/day, and the amount of agglutinated sludge supplied from the agglutinating reaction tank 13 to the second preliminary dewatering device 14 can be in the amount of 2,200 ton/day. With the system as shown in FIG. 3 operating under such conditions, only 0.035 tons/day of agglutinating agent needs to be fed to the agglutinating reaction tank 13 from the agglutinating supply tank 17 while providing satisfactory dewatering efficiency.

The present invention is not limited to the embodiments explained above, but various modifications and alternations can be conceived by those skilled in the art within the scope of the present invention. For example, in the above embodiment, the main dewatering device 12 is formed by the screw press, but it can be constructed by any other dewatering device such as a decant. Further, in the above embodiment, the sludge which has settled in the agglutinating reaction tank is supplied to the main dewatering device 12, but it can be supplied to another dewatering device by considering the amount of the raw sludge to be treated. For example, when the amount of the raw sludge to be treated is large compared with the capacity of the main dewatering device 12, the settled sludge in the agglutinating reaction tank 13 can be further treated by another main dewatering device provided separately from the main dewatering device 12. This another or second main dewatering device where the agglutinating sludge is dewatered can be arranged to received the agglutinated sludge directly from the agglutinating tank or by way of the second preliminary dewatering device. Either the main dewatering device or second main dewatering device can receive the agglutinated sludge from, for example, the second preliminary dewatering device for the purposes of dewatering the agglutinated sludge.

As explained above in detail, in the sludge treating method according to the invention, only the waste waters discharged out of the preliminary and main dewatering devices are supplied to the agglutinating reaction tank, and thus a necessary amount of the expensive macromolecular agglutinating reagent can be reduced materially, so that the operating cost for processing the sludge can be decreased.

What we claimed is:

1. A method of dewatering sludge wastes comprises the steps of:
    supplying sludge wastes into a preliminary dewatering device and obtaining a preliminarily dewatered sludge and a waste water discharge;
    supplying said preliminarily dewatered sludge from said preliminary dewatering device into a main dewatering device, and dewatering said preliminary dewatered sludge in said main dewatering device and discharging resulting solid substance and a waste water;
    supplying the waste water discharged from said preliminary dewatering device and waste water discharged from said main dewatering device into an agglutinating reaction tank;
    supplying a macromolecular agglutinating agent into said agglutinating reaction tank to form an agglutinated sludge; and
    dewatering said agglutinated sludge.

2. A method according to claim 1, wherein said step of dewatering said agglutinated sludge is performed by supplying said agglutinated sludge into said main dewatering device.

3. A method according to claim 1, wherein said agglutinated sludge is supplied to said main dewatering device dewatering device from a a second preliminary dewatering device.

4. A method according to claim 3, wherein prior to supplying said sludge wastes into said preliminary dewatering device, said sludge wastes are supplied into a clarifier for settling solids contained in said sludge wastes, settled sludge wastes formed on a bottom of said clarifier are introduced into said preliminary dewatering device and supernatant from a top of said clarifier discharged.

5. A method according to claim 4, wherein waste water discharged from said second preliminary dewatering device is supplied to said clarifier.

6. A method according to claim 1, wherein sludge wastes contained in said preliminary dewatering device are dewatered by a thickener of a rotary screen type.

7. A method according to claim 1, wherein in said preliminarily dewatered sludge contained in said main dewatering device is treated by a screw press.

8. A method of dewatering sludge wastes comprising the steps of:
    supplying sludge wastes to a first preliminary dewatering device, dewatering said sludge wastes and obtaining a preliminarily dewatered sludge and a waste water discharge;
    supplying said preliminarily dewatered sludge from said preliminary dewatering device into a main dewatering device;
    dewatering said preliminary dewatered sludge in said main dewatering device, and discharging resulting solid substance and a waste water discharge;
    supplying the waste water discharged from said first preliminary dewatering device and waste water discharged from said main dewatering device into an agglutinating reaction device;
    supplying a macromolecular agglutinating agent into said agglutinating reaction tank to form an agglutinated sludge;
    supplying said agglutinated sludge to a second preliminary dewatering device; and
    dewatering said agglutinated sludge in said second preliminary dewatering device, discharging resulting waste water, and supplying dewatered agglutinated sludge to said main dewatering device.

9. A method according to claim 8, wherein sludge wastes contained in said first preliminary dewatering device are dewatered by a thickener of a rotary screen type.

10. A method according to claim 8, wherein in said preliminarily dewatered sludge contained in said main dewatering device is treated by a screw press.

11. A method of dewatering sludge wastes comprising the steps of:
    supplying sludge wastes to a clarifier, feeding settled sludge from said clarifier to a first preliminary dewatering device, and discharging a supernatant from said clarifier;
    dewatering said settled sludge in said first preliminary dewatering device, discharging a waste water and supplying a resulting preliminarily dewatered sludge to a main dewatering device;
    dewatering said preliminary dewatered sludge in said main dewatering device, discharging a waste water and discharging resulting solid substance;
    supplying the waste water discharged from said first preliminary dewatering device and waste water discharged from said main dewatering device into an agglutinating reaction tank;
    supplying a macromolecular agglutinating agent into said agglutinating reaction tank to form an agglutinated sludge;
    supplying said agglutinated sludge to a second preliminary dewatering device; and
    dewatering said agglutinated sludge in said second preliminary dewatering device, discharging resulting waste water, and supplying dewatered agglutinated sludge to said main dewatering device.

12. A method according to claim 11, wherein sludge wastes contained in said first and second preliminary dewatering devices are dewatered by a thickener of a rotary screen type.

13. A method according to claim 11, wherein said preliminarily dewatered sludge contained in said main dewatering device is treated by a screw press.

* * * * *